(12) United States Patent
Aubault et al.

(10) Patent No.: US 9,810,204 B2
(45) Date of Patent: Nov. 7, 2017

(54) FLOATING WIND TURBINE PLATFORM STRUCTURE WITH OPTIMIZED TRANSFER OF WAVE AND WIND LOADS

(71) Applicant: PRINCIPLE POWER, INC., Emeryville, CA (US)

(72) Inventors: Alexia Aubault, San Francisco, CA (US); Christian Cermelli, Bouc Bel Air (FR); Dominique Roddier, Emeryville, CA (US); Bing Bin Yu, Hayward, CA (US); Sriram Narayanan, Oakland, CA (US); Alireza Lahijanian, Berkeley, CA (US)

(73) Assignee: Principle Power, Inc., Emeryville, CA (US)

( * ) Notice: Subject to any disclaimer, the term of this patent is extended or adjusted under 35 U.S.C. 154(b) by 0 days.

(21) Appl. No.: 15/186,307

(22) Filed: Jun. 17, 2016

(65) Prior Publication Data

US 2016/0369780 A1 Dec. 22, 2016

(51) Int. Cl.
*B63B 35/44* (2006.01)
*F03D 13/25* (2016.01)
(Continued)

(52) U.S. Cl.
CPC .............. *F03D 13/25* (2016.05); *B63B 1/107* (2013.01); *B63B 35/44* (2013.01); *B63B 39/03* (2013.01);
(Continued)

(58) Field of Classification Search
CPC .......... F03D 13/25; B63B 1/107; B63B 35/44
See application file for complete search history.

(56) References Cited

U.S. PATENT DOCUMENTS

| 3,835,800 A | 9/1974 | Lloyd, III et al. |
| 4,166,426 A | 9/1979 | Lloyd, III |

(Continued)

FOREIGN PATENT DOCUMENTS

| CA | 996764 | 9/1976 |
| DE | 19620906 A1 | 3/1998 |

(Continued)

OTHER PUBLICATIONS

International Search Report and Written Opinion of the International Searching Authority for International Application No. PCT/US15/57636, dated May 6, 2016, 12 pages.

(Continued)

*Primary Examiner* — Stephen Avila
(74) *Attorney, Agent, or Firm* — Dergosits & Noah LLP (57) ABSTRACT

A structure of a floating, semi-submersible wind turbine platform is provided. The floating wind turbine platform includes three elongate stabilizing columns, each having a top end, a keel end, and an outer shell containing an inner shaft. Each stabilizing column further includes a water entrapment plate at its keel cantilevered in a plane perpendicular to a longitudinal axis of the stabilizing column. The floating wind turbine platform also includes three truss members, each truss member including two horizontal main tubular members and two diagonal tubular members. The truss members connect the stabilizing columns to form a triangular cross-section. An elongate wind turbine tower is disposed over the top end of one of the three stabilizing columns such that the longitudinal axis of the tower is substantially parallel to the longitudinal axis of the stabilizing column.

20 Claims, 7 Drawing Sheets

(51) Int. Cl.
*B63B 1/10* (2006.01)
*B63B 39/03* (2006.01)
*B63B 39/06* (2006.01)
*B63B 1/12* (2006.01)

(52) U.S. Cl.
CPC ........ *B63B 39/06* (2013.01); *B63B 2001/128* (2013.01); *B63B 2035/446* (2013.01); *B63B 2039/067* (2013.01); *F05B 2240/93* (2013.01); *F05B 2240/95* (2013.01); *Y02E 10/727* (2013.01)

(56) References Cited

U.S. PATENT DOCUMENTS

| | | |
|---|---|---|
| 4,167,147 A | 9/1979 | Bergman |
| 4,538,939 A | 9/1985 | Johnson |
| 4,648,848 A | 3/1987 | Busch |
| 4,781,023 A | 11/1988 | Gordon |
| 6,558,215 B1 | 5/2003 | Boatman |
| 7,086,809 B2 | 8/2006 | Busso |
| 7,156,037 B2 | 1/2007 | Borgen |
| 7,242,107 B1 | 7/2007 | Dempster |
| 7,531,910 B2 | 5/2009 | Flottemesch |
| 8,053,916 B2 | 11/2011 | Edwards et al. |
| 8,129,852 B2 | 3/2012 | Edwards et al. |
| 8,471,396 B2 | 6/2013 | Roddier |
| 8,729,723 B2 | 5/2014 | Boureau et al. |
| 2003/0159638 A1 | 8/2003 | Lay et al. |
| 2004/0141812 A1 | 7/2004 | Busso |
| 2006/0165493 A1 | 7/2006 | Nim |
| 2007/0240624 A1 | 10/2007 | Collee et al. |
| 2008/0014025 A1 | 1/2008 | They |
| 2008/0038067 A1 | 2/2008 | Sharapov |
| 2010/0003134 A1 | 1/2010 | Edwards |
| 2010/0140944 A1 | 6/2010 | Gardiner et al. |
| 2011/0037264 A1 | 2/2011 | Roddier |
| 2011/0074155 A1 | 3/2011 | Scholte-Wassink |
| 2011/0140426 A1 | 6/2011 | Garcia Lopez et al. |
| 2011/0148115 A1 | 6/2011 | Roznitsky et al. |
| 2012/0073487 A1 | 3/2012 | Pantaleon et al. |
| 2012/0269628 A1 | 10/2012 | Liu |
| 2012/0294681 A1 | 11/2012 | Wong |
| 2013/0099496 A1 | 4/2013 | Soheim |
| 2013/0276691 A1 | 10/2013 | Thieffry |
| 2014/0193259 A1 | 7/2014 | Borgen |
| 2014/0246232 A1 | 9/2014 | Wyatt |
| 2015/0147174 A1 | 5/2015 | Couchman et al. |
| 2015/0275850 A1 | 10/2015 | Numajiri |

FOREIGN PATENT DOCUMENTS

| | | |
|---|---|---|
| DE | 19802574 A1 | 3/1999 |
| DE | 20001864 U1 | 4/2000 |
| DE | 19955586 A1 | 6/2001 |
| DE | 20020232 U1 | 1/2002 |
| DE | 202014004373 U1 | 6/2014 |
| EP | 1363019 | 11/2003 |
| EP | 2143629 A1 | 1/2010 |
| EP | 2074018 B1 | 5/2010 |
| GB | 1065216 A | 4/1967 |
| JP | 1988039500 | 2/1988 |
| JP | 1991235789 | 10/1991 |
| JP | 1992197887 | 7/1992 |
| JP | 1994158571 | 6/1994 |
| JP | 10511753 A | 11/1998 |
| JP | 2000203487 | 7/2000 |
| JP | 2001180584 | 7/2001 |
| JP | 2003343447 | 12/2003 |
| JP | 2008013101 | 1/2004 |
| JP | 2004175137 | 6/2004 |
| JP | 2004176626 | 6/2004 |
| JP | 2004218436 | 8/2004 |
| JP | 2004251139 | 9/2004 |
| JP | 2004526609 | 9/2004 |
| JP | 2005504205 | 2/2005 |
| JP | 2005069025 | 3/2005 |
| JP | 2005271673 | 10/2005 |
| JP | 2006274816 | 10/2006 |
| JP | 2007002721 | 1/2007 |
| JP | 2007263077 | 10/2007 |
| JP | 2008095512 | 4/2008 |
| JP | 2010064649 | 3/2010 |
| JP | 2010115978 | 5/2010 |
| JP | 2010234980 | 10/2010 |
| JP | 2009213487 | 12/2011 |
| JP | 2012045981 | 3/2012 |
| JP | 2012107584 | 6/2012 |
| JP | 2002188557 | 7/2012 |
| JP | 2014061848 | 4/2014 |
| JP | 2014111924 | 6/2014 |
| JP | 2014218186 | 11/2014 |
| JP | 2014218958 | 11/2014 |
| JP | 2015006884 | 1/2015 |
| WO | 8505174 | 11/1985 |
| WO | 0134977 | 5/2001 |
| WO | 0228702 | 4/2002 |
| WO | 02073032 A1 | 9/2002 |
| WO | 02088475 A1 | 11/2002 |
| WO | 2007071647 | 6/2007 |
| WO | 2011138824 | 11/2011 |
| WO | 2011147482 | 12/2011 |
| WO | 2012059381 | 5/2012 |
| WO | 2013156759 | 10/2013 |
| WO | 2015063215 A1 | 5/2015 |
| WO | 2005075822 | 8/2015 |

OTHER PUBLICATIONS

International Search Report and Written Opinion of the International Searching Authority for International Application No. PCT/US14/38853, dated Dec. 12, 2014 12 pages.
International Preliminary Report on Patentability for International Application No. PCT/US09/39692, dated Jul. 15, 2010, 7 pages.
European Search Report for Appln. No. 14152768.9 dated Mar. 27, 2014.
"A Study on Antiwave Performance of Box Girder Type Floating Wind Farm", by Ohta et al., 17th Marine Engineering Symposium, The Society of Naval Architects of Japan, Jul. 2003, pp. 115-118.
International Search Report and Written Opinion of the International Searching Authority for International Application No. PCT/US16/38235, dated Nov. 2, 2016, 11 pages.
Supplementary European Search Report for Application No. 14801382.4-1607 / 2992208 PCT/US2014038853, 5 pages.

FLOATING WIND TURBINE PLATFORM STRUCTURE WITH OPTIMIZED TRANSFER OF WAVE AND WIND LOADS

CROSS REFERENCE

This application claims priority to U.S. Provisional Patent Application No. 62/182,245, titled "Floating Wind Turbine Platform Structure with Optimized Transfer of Wave and Wind Loads" filed Jun. 19, 2015, the entire contents of which are hereby incorporated by reference.

This application is also related to U.S. patent application Ser. No. 14/218,805, entitled "Asymmetric Mooring System for Support of Offshore Wind Turbines," filed on Mar. 18, 2014, which is a continuation of U.S. patent application Ser. No. 13/925,442, filed Jun. 24, 2013, now issued as U.S. Pat. No. 8,692,401, on Apr. 8, 2014, which is a continuation of U.S. patent application Ser. No. 12/988,121, filed Oct. 15, 2010, now issued as U.S. Pat. No. 8,471,396, on Jun. 25, 2013, which is a national stage application of PCT Patent Application No. PCT/US2009/039692, filed Apr. 6, 2009, which claims priority to U.S. Provisional Patent Application No. 61/125,241, titled "Column-Stabilized Offshore Platform With Water-Entrapment Plates And Asymmetric Mooring System For Support Of Offshore Wind Turbines" filed Apr. 23, 2008, the entire contents of which are hereby incorporated by reference.

This application is further related to U.S. patent application Ser. No. 14/283,051, entitled "System and Method for Controlling Offshore Floating Wind Turbine Platforms," filed on Mar. 20, 2014, which claims priority to U.S. Provisional Patent Application 61/825,412, entitled, "Fully-Integrated Control System for Offshore Floating Wind Turbine Platforms," filed on May 20, 2013, the entire contents of which are hereby incorporated by reference.

This application is also related to U.S. patent application Ser. No. 14/927,448, entitled "Connection System for Array Cables of Disconnectable Offshore Energy Devices," filed on Oct. 27, 2015, which claims priority to U.S. Provisional Patent Application 62/069,235, entitled, "Connection System for Array Cables of Disconnectable Offshore Energy Devices," filed on Oct. 27, 2014, the entire contents of which are hereby incorporated by reference.

SUMMARY

The invention relates to offshore floating wind turbines, and in particular, to an arrangement of structural components that optimize load transfer of turbine and ocean-generated loads within the floating structure. The invention further facilitates design and fabrication of the hull.

BACKGROUND

Offshore wind energy is a very promising source of renewable energy for the reason that offshore wind is more intense and uniform than on-land wind. To harness wind energy in deeper water further offshore, one solution is to build floating wind turbines. Floating wind turbines face technical challenges that are different from both on-land wind turbines and floating oil and gas platforms.

Different from onshore wind turbines, a floating wind turbine requires a platform that provides buoyancy to support the weight of the whole structure. The structure of the platform may have several cylinder-shaped columns with large diameters. Besides providing buoyancy, the platform combined with the wind turbine generator should be able to resist dynamic wind, wave and current load, and provide a stable support for power production. Another challenge is the added fatigue damage from wave load, which might be comparable to that due to wind load. This requires a robust structural design to achieve better reliability.

One unique challenge of designing floating wind turbines, when compared to floating oil and gas platforms, is that a large load is transferred from the tower of the wind turbine generator to the platform through a very concentrated location at the tower base connection. The columns of the platform usually have much larger diameters than the tower of the wind turbine generator in order to provide buoyancy. The traditional way to strengthen the tower base connection with the floater's deck is to reinforce with large amount of welded stiffeners, which may not be cost efficient. Compared to the oil and gas industry, offshore wind energy production has a much smaller profit margin. One goal of structural design is to minimize the weight and cost of the structure. Therefore, simplified stiffening on the platform columns is preferable.

Thus, there is a need for offshore wind turbines to have a structural platform design that provides load bearing capacity, hydrodynamic stability and good reliability with minimized cost.

DETAILED DESCRIPTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

The floating wind turbine platform disclosed herein introduces an innovative structural design for a floating foundation. In an embodiment, the floating wind turbine platform is a three-column semi-submersible platform with tubular truss members connecting all the columns. Water entrapment plates may be attached to the bottom portion (i.e., the keel end) of some or all of the columns as large plates extending horizontally (i.e., cantilevered) at the base of the columns. The wind turbine generator tower is subject to considerable wind loads very high on the structure, and spacing between columns helps achieve stability.

The columns included in the platforms described herein can be coupled to each other with tubular truss members that include horizontal and diagonal tubular members. Each column is comprised of two concentric cylinders: an outer shell that serves as the floater to provide buoyancy, and an inner shaft with a smaller diameter than the outer shell that serves as the vertical tubular member for bearing wind turbine loads. The inner shafts also transfer the global hydrodynamic and hydrostatic loads between the columns, where the hydrodynamic and hydrostatic loads are carried by the outer shell. Additionally, the inner shafts transfer turbine loads (i.e., bending moment and associated shear force at the tower base) to other columns through the horizontal main tubular members and the diagonal tubular members, all of which are connected to the inner shafts. The wind turbine tower induced moment can therefore be compensated by relative changes of buoyancy of the individual columns.

The floating wind turbine platforms described herein may also include additional features beyond the truss structure that improve the performance of the wind turbine platform. In some embodiments, the floating wind turbine platform may include an active ballast system that moves liquid ballast between the stabilizing columns (see, U.S. Pat. No. 8,471,396), which allows the wind-induced moment to be compensated by a change of weight of individual columns through pumping liquid between columns. The columns may house an active ballast system that transfers liquid between tanks within the columns via pumps to keep the floating platform in a vertical upright alignment for optimum power conversion efficiency. For example, when the wind is blowing towards the tower, a sensor can detect the rotation of the wind turbine generator. The sensor may be coupled to a controller that controls the pumps to remove liquid from one column to increase the buoyancy, and to add liquid into another column to increase weight in that column. In an embodiment, there can be multiple pumps in each column controlling independent liquid paths to and from the other columns.

The ballast controller can also adjust the liquid volumes in the columns to adjust the side-to-side angle of the wind turbine generator. In some embodiments, the columns have sensors that detect the volume of liquid by the different water depths in each of the columns. The active movement of the liquid ballast between columns may compensate for the induced wind forces to keep the platform leveled. In some embodiments, the active ballast system can be a closed loop system configured to prevent the possible flooding and sinking of the floating wind turbine platform by completely isolating the liquid in the ballast system from the surrounding seawater. The ballast pumps may cause the liquid to flow through piping associated with the truss members connected between each of the columns. In such an embodiment, the surrounding sea water is never allowed into the active ballast system. The liquid used in the active ballast system may be fresh water to mitigate corrosion problems and other seawater related issues. The water may be added quayside before towing out to sea, or added by a supply boat.

In an embodiment of the liquid ballast system, alignment sensors that include gyroscopes mounted along the X axis and Y axis may be used to control the distribution of ballast liquid among the columns. The gyroscopes output a signal that represents the angular rate of rotation which can be in units of degrees per second. An integration of the angular rate of rotation will produce an angular position. Thus, the gyroscopes in the alignment sensor can be used to measure variation in the alignment of the platform and tower. The X axis gyroscope is in the horizontal plane and can be aligned with center line of the floating wind turbine platform. The Y axis accelerometer is also in the horizontal plane but perpendicular to the X axis gyroscope. The trim angle $\alpha$ is the angle of the structure about the Y axis and the list angle $\gamma$ is the angle of the structure about the X axis.

When the structure is perfectly aligned, the X and Y axis gyroscope will not detect any acceleration. However, if the structure leans in any direction, the X axis gyroscope will detect trim rotation and the Y axis gyroscope will detect list rotation. Based upon this information, the angle of rotation can be calculated using known mathematical equations. For example, the platform trim and list angles, $\alpha$ and $\gamma$, are input signals provided to the ballast control system by the gyroscopes. Firstly, the measured signals may be low-pass filtered to cancel off all the high-frequency disturbances resulting from the wave and wind dynamic and stochastic effects. The platform trim and list angles are low-pass filtered using standard low-pass filtering strategies such as high-order Butterworth filters. Based on the filtered platform trim and list angles, $\bar{\alpha}$ and $\bar{\gamma}$, the relative angles $\theta_{i-j}$ between column top centers i and j, are derived using the following equations:

$$\begin{cases} \theta_{1-2} - \left(\frac{\sqrt{3}}{2}\bar{\gamma} + \frac{1}{2}\bar{\alpha}\right) \\ \theta_{1-3} - \left(\frac{\sqrt{3}}{2}\bar{\gamma} + \frac{1}{2}\bar{\alpha}\right) \\ \theta_{2-3} = \bar{\alpha} \end{cases} \quad (1)$$

The following convention is used. If $\theta_{i-j}$ is positive, it means that column i is higher than column j. The error $e_{i-j}=|\theta_{set}-\theta_{i-j}|$ is the error used as an input to the controller. Usually, $\theta_{set}=0°$. Based on the sign of $\theta_{i-j}$, the correct pump $P_{i-j}$ will be turned on provided that $e_{i-j}$ is greater than a certain value that defines the dead-band for ON. The pumps $P_{i-j}$ or $P_{j-i}$ will be switched off provided that $e_{i-j}$ is less than a certain value that defines the dead-band for OFF. Depending on the relative angles $\theta_{i-j}$, one, two or three ballast pumps will be on. With this algorithm based on the relative angles between stabilizing column top centers, the fastest liquid transfer path is always considered, thus the platform is always back to even keel very quickly or as fast as possible in every situation. Automatic bypass is also functioning with that approach, if one pump suddenly becomes deficient. The platform dynamics are measured, including its trim and list angles, $\alpha$ and $\gamma$, and used to provide a heel angle measurement fed back into the feedback loop. Thus, based upon the alignment sensor signals, the ballast controller can control the pumps to adjust the liquid volume within each of the columns to correct the vertical alignment angular offset. When the platform is within the acceptable horizontal angle, the ballast system will stop moving liquid between the stabilizing columns.

In an embodiment, the wind turbine generator tower is attached to the top of the inner shaft of one of the stabilizing columns, which is itself coupled to the inner shafts of other columns by the truss members. In some embodiments, the truss members may also be secured to the stabilizing column outer shell as well. For example, the truss members may be welded to the outer shells of each column. This construction improves the overall structural efficiency of the floating wind turbine platform and allows the structure to be of a relatively light weight. The wind turbine tower may be coupled directly above a stabilizing column that supports the weight of the tower and wind turbine components, while the other stabilizing columns primarily function to stabilize the platform as a whole and keep the tower in a substantially vertical alignment. As discussed above, the active ballast control system, in an embodiment, can be used to move ballast liquid between the stabilizing columns to help enhance the stability of the platform.

In some embodiments, the diameter of the stabilizing column which carries the wind turbine generator tower may be larger than the diameter of the other two stabilizing columns in order to provide additional buoyancy to compensate for the weight of the tower and turbine. In another embodiment, the distance between the centers of the two stabilizing columns not carrying the wind turbine generator may be different than the distance between the center of the two columns not carrying the wind turbine generator and the center of the column carrying the wind turbine generator. In this particular three stabilizing column embodiment, the triangular cross section appears as an isosceles triangle, different from another embodiment where the distances between the stabilizing columns centers are uniform and appearing as an equilateral triangle cross-section. In another embodiment, the distances between the stabilizing columns can all be different, thereby resulting in a triangular cross section that manifests as a scalene triangle.

A nacelle, which can house, for example, one or more of a pitch control system for the turbine blades, gear box, yaw controller and generator, can be mounted on top of the tower and can provide support to the hub and turbine blades that extend from the hub. The hub can include a mechanism that allows the pitch of the turbine blades to be adjusted so that the rotational speed of the turbine blades is constant over a normal wind speed range. The nacelle can be coupled to a yaw control system, which points the turbine blades directly into the wind for optimum efficiency. Wind turbine equipment, such as the gear box and electrical generator, that are typically positioned within the nacelle may reside there, or, in another embodiment, they may be positioned lower in the tower, or on top of a stabilizing column.

In another embodiment, direct drive turbines, which do not have gear boxes, may also be used with the semi-submersible wind turbine platforms described herein. The electrical power produced by the generator can be in a random frequency and amplitude due to the variable wind speed. The electrical power can be altered with a transformer, inverter and a rectifier to produce a uniform output voltage and current. In various embodiments, these electrical components can be located either in the nacelle, at the bottom of the tower, or on the top side of another stabilizing column.

The electrical output from the wind turbine can be transmitted through an electrical cable that runs to the sea floor and a power station. Rather than running straight to the sea floor, a portion of the cable can be coupled to buoyancy mechanisms that elevate the portion of the cable. The cable may then have a curved path, which allows the floating wind turbine platform to move vertically or horizontally with the waves, current and tides without putting any significant additional tension on the cable. (See, e.g., application Ser. Nos. 62/069,235 and 14/924,448, previously incorporated by reference.)

In an embodiment, the floating wind turbine platform has a special configuration that provides a high strength structure. While the description herein generally refers to truss members being mounted between the three columns, where the truss members are equal in length and the resulting triangular cross-section forms substantially an equilateral triangle, one of ordinary skill in the art can appreciate that the platform may be formed by more than three stabilizing columns, and may be formed by more than three truss members and by truss members of unequal length.

Specifically, in an embodiment, each of at least three stabilizing columns may be disposed at a vertex of a convex polygon (e.g., a triangle) formed by the at least three stabilizing columns and the at least three truss members that connect to the stabilizing columns. The convex polygon cross-section (e.g., triangular cross section in one embodiment) is formed by the stabilizing columns and the truss members in a plane perpendicular to the longitudinal axes of the at least three stabilizing columns.

In another embodiment, the truss members mounted between the three columns may be of different lengths, thereby forming, in some instances, an isosceles triangle with the column supporting the wind turbine generator tower at the vertex where the two equal length truss members meet. In other embodiments, unequal length truss members mounted between the three columns may form a scalene triangle in cross-section.

In some embodiments, high strength marine grade structural steel (e.g., up to 420 MPa yield strength) may be used in the truss member horizontal main tubular members and diagonal tubular members. Additionally, parts that can be pre-fabricated in a factory setting (e.g., straight tubular members) can be made with steel up to 690 MPa yield strength in order to minimize weight and construction costs.

Figure 1:
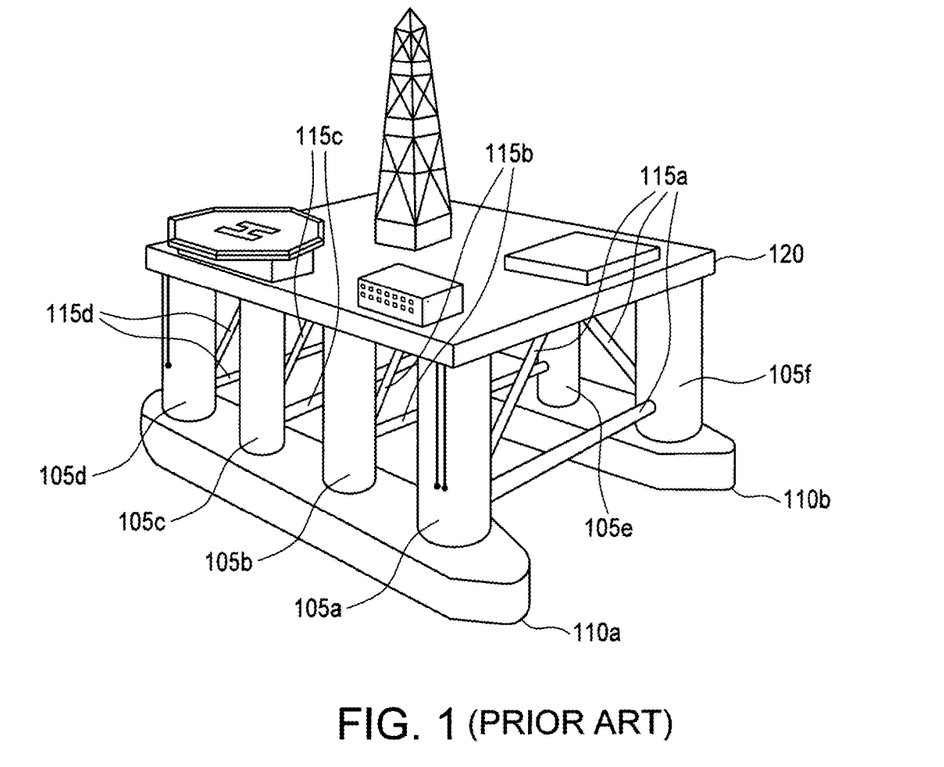
FIG. 1 depicts an example of a prior art semi-submersible platform used for drilling in the oil and gas industry.

Referring now to the figures, a hull-shaped semi-submersible is commonly used in the oil and gas industry, as shown in FIG. 1. The hull-shaped semi-submersible design is a column stabilized design that derives stability from the distance between columns 105a, 105b, 105c, 105d, 105e and 105f rather than from the size of the waterplane area the way ship-shape structures would. Additional buoyancy is provided by large pontoons 110a and 110b that connect columns 105a, 105b, 105c and 105d, and 105e, 105f and two additional columns that are obstructed in FIG. 1. In some embodiments, the columns 105a, 105b, 105c, 105d, 105e and 105f may be round or square, and are usually orthogonally stiffened; however, the columns can be any of a variety of shapes. In semi-submersibles, wave loads encountered by the columns are transferred laterally between columns through pontoons 110a and 110b and occasionally tubular truss members 115a, 115b, 115c and 115d, which are framed into the column outer shells. The columns also support a topside platform 120, which produces vertical gravity loads to the top of the columns.

Comparatively, the loadings on floating foundations for wind turbines are different. They are a combination of two types of loads. The first type of loads on the platform is turbine loads. They are generated by the rotor connected to the nacelle at the tower top and then transferred at the base of the tower through bending moment as well as axial and shear force. These loads have the particularity of being relatively high in normal operation, when the turbine is spinning and producing electricity. They include aerodynamic wind loads, as well as inertia and gravity loads on the rotor-nacelle assembly (RNA) and tower. These loads are non-linear and result in a high bending moment at the base of the tower, and also result in associated horizontal shear.

Shear loads may vary depending on turbine power, which varies roughly proportional to rotor diameter. A multi-megawatt turbine will typically result in nominal loads of a few 100 s to a few 1000 s lN, and bending moments are of the order of 10 to 100 times the basic shear loads, depending on tower height. Tower height is further dependent on the length of the turbine blades. For example, the tower is typically at a height such that the tips of the turbine blades, at their lowest positions, are approximated 15-20 meters above sea level. Thus, the structure of the floating platform needs to be designed to handle these shear and bending moment loads.

Gravity loads also create a vertical load at the base of tower. The predominance of these loads in regular operating conditions points to the importance of fatigue loading on the overall structure. Frequently occurring loads generate fatigue damage, and the connections between various parts of the structure must be designed to provide sufficient fatigue life to the platform. Extreme loads on the RNA and tower, whether due to extreme motions or extreme rotor wind loads, also play a significant role in the design of the floating platform.

The second and third types of loads on the floating wind platform are hydrodynamic and hydrostatic loads. Hydrodynamic loads include wave loads from diffraction and radiation of waves on the hull and from viscosity, and current loads. Hydrodynamic loads also include buoyancy. These types of hydrodynamic loads are important in the design of all types of semi-submersibles.

The structure of the floating wind turbine platform is engineered, in an embodiment, to withstand and transfer this complex combination of loads as optimally as possible, while ensuring cost effectiveness of fabrication. This is achieved through a number of structural innovations in the different parts of the floating wind turbine platform, which are highlighted in FIGS. 2-6.

Figure 2:
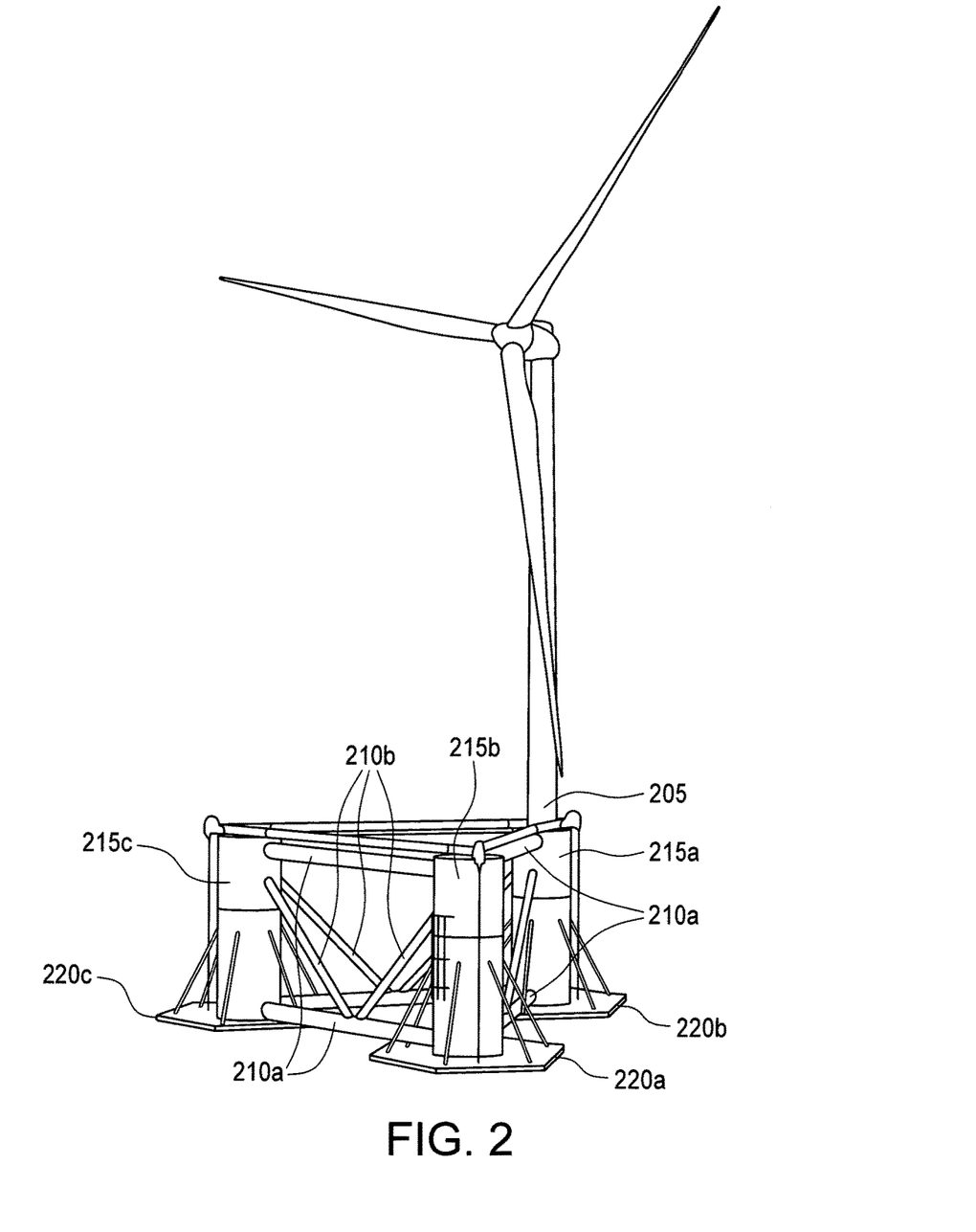
FIG. 2 depicts structural components of a floating wind turbine platform.

FIG. 2 depicts the structural components of a floating wind turbine platform. The tower to foundation connection 205 at the top of one of the column 215a is made through a flange connection, for ease of installation of the turbine and RNA. This flange connection is typical of onshore turbine and of offshore monopiles. In the case of floating structures, where the floating part of the structure is typically designed for floatability and for wave load bearing, the loads need to be passed through to the foundation. In an embodiment of the floating wind turbine platform, the transfer of load to the foundation is achieved by a direct connection between the flanges and an inner shaft of identical diameter inside the stabilizing column 215a that supports the tower. The tower base diameter for multi-megawatt offshore turbines varies (most often between 3 and 7 meters), but is typically smaller than the diameter necessary for the stabilizing column to provide buoyancy, so that the tower to stabilizing column connection could not be a simple flange. Instead an inner shaft is provided inside the outer shell of the stabilizing column. The provision of the inner shaft inside of the outer shell minimizes the amount of detailing required at the connection of the tower with the column. This configuration also minimizes the amount of additional structure needed. The connection is optimized locally for fatigue load bearing. The inner shaft or the flange may also be connected with the remaining top portion of the column, to provide integrity to the column. The top of column may experience local loads and need local reinforcement; however, it is not engineered to transfer global turbine loads into the entire foundation. Most loads from the wind turbine tower are passed into the inner shaft by using a flange connection to the inner shaft.

Additionally, water entrapment plates ("WEPs") 220a, 220b and 220c may be directly connected to the columns at their keel end as flat stiffened plates. WEPs 220a, 220b and 220c carry significant vertical pressure loads from wave loads and viscous loads due to vortex-shedding at the edges of the WEP. These loads are transferred to the stabilizing columns. These loads are generally smaller than, the hydrostatic pressure on the nearby columns. Thus, the WEP plate thickness is typically small in comparison to the stabilizing columns outer shells.

Furthermore, the WEPs 220a, 220b and 220c are cantilevered off of the main structures (e.g., columns and/or truss members, as will be discussed in further detail below), to transfer loads back to the structure. This configuration provides a lot of freedom to adjust the shape of the WEPs as necessary for overall platform behavior, while relying on the same overall design for the columns and truss members. The WEPs increase damping of wind- and wave-induced motions, and provide for tuning of the platform resonant periods relative to wave periods. The connections of the WEPs to the stabilizing columns need to withstand the cyclic fatigue loads generated by hydrodynamic wave pressures on the WEPs over the lifetime of the platform as well as the extreme hydrodynamic loads in large sea-states. The outer shell of the stabilizing columns bears the majority of these hydrostatic loads on the hull.

The inner shafts inside each of the stabilizing columns 215a, 215b and 215c are part of an overall truss structure that includes horizontal main tubular members 210a and diagonal tubular members 210b and that connects the stabilizing columns 215a, 215b and 215c together.

Figure 3:
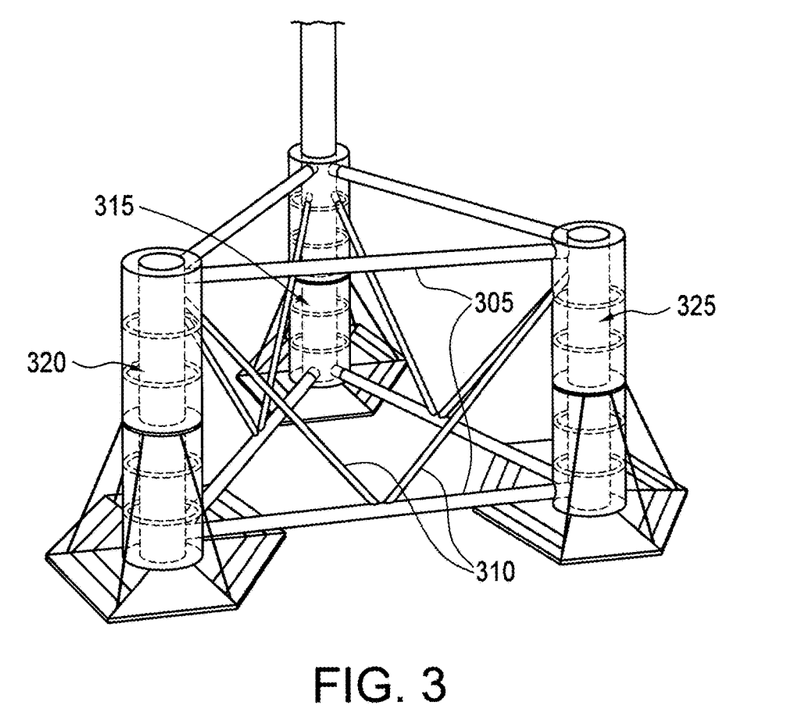
FIG. 3 provides a detailed illustration of a truss structure.

As shown in more detail in FIG. 3, the inner shafts 315, 320 and 325 within each column are made of slender unstiffened tubular members, and serve as part of the overall truss structure. The overall truss structure is designed to withstand global load transfer on the structure, especially the turbine loads at the base of tower, but also global hydrodynamic and hydrostatic loads. In an embodiment, these are three truss members. Each truss member has two horizontal main tubular members 305 and two diagonal tubular members 310. The two horizontal main tubular members 305 shown in FIG. 3 as extending between columns containing inner shafts 320 and 325 may also be referred herein as lateral truss members for their capability to transfer loads laterally between the columns, which are exposed to ocean environmental loads. In addition to the two horizontal main tubular members 305, the truss member may further include two diagonal tubular members 310. The two diagonal tubular members 310 are used to provide additional structural support to the lateral truss by connecting one of the columns to one of the two horizontal main tubular members 305.

Pressure loads (i.e., hydrostatic and hydrodynamic loads) on the truss members may be minimized by keeping the diameters of the horizontal main tubular members 305 and the diameters of the diagonal tubular members 310 small enough such that the pressure loads do not affect the wall thickness of the truss members (i.e., a length-to-diameter ratio of greater than 7, which often results in diameters in the range of 1 to 2.5 meters). Local buckling may occur as a result of pressure being applied to a WEP or to one of the outer shells. With smaller diameters, local buckling resistance is improved, i.e., a plate is less likely to give in when it is bent against the applied pressure than when it is flat. The circular cross section of the horizontal main and diagonal tubular members of the truss members is favorable from the standpoint of hydrodynamic loads as it minimizes drag resistance when compared to similar rectangular sections. The circular cross section can also efficiently transfer loads coming from waves from all directions. Additionally, the circular cross section can be fabricated efficiently, using the same assembly lines used to fabricate wind turbine towers.

Figure 4A:
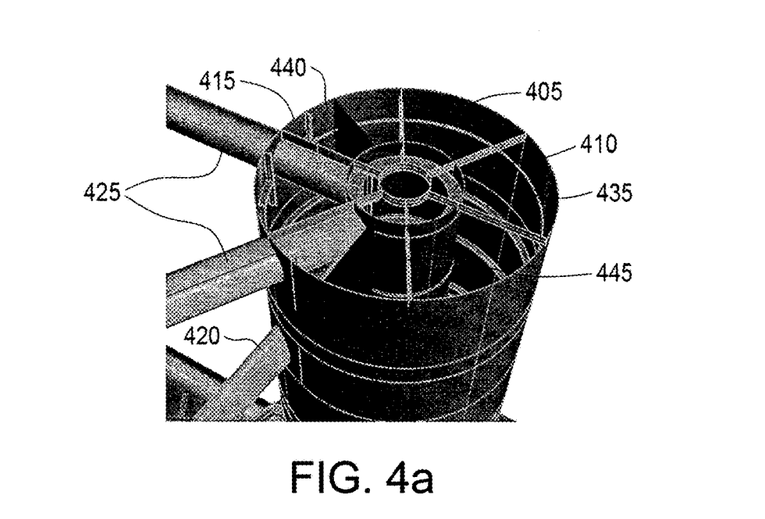
FIGS. 4a and 4b provide a detailed illustration of embodiments of a stabilizing column.
Figure 4B:
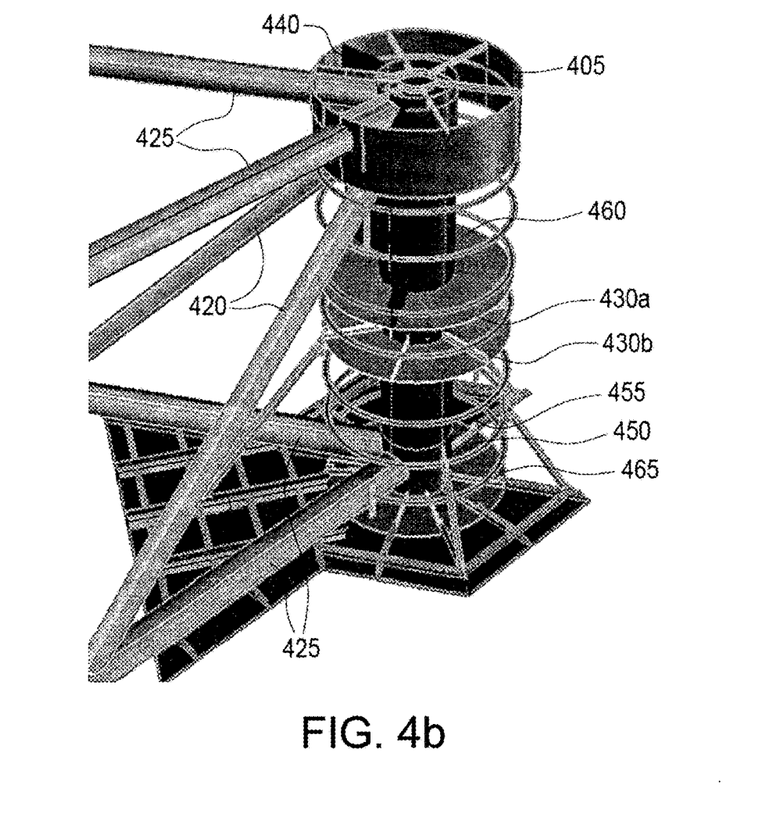

FIGS. 4a and 4b provide a detailed illustration of a stabilizing column in an embodiment. Each of the several stabilizing columns includes an inner shaft that is protected from external weather since it is contained inside of the outer shell of the stabilizing column. As shown in FIG. 4a, the inner shaft 405 is designed to primarily bear the global loads transferred by the tower and truss members. The inner shaft may also take on some external static pressure from ballast compartments or pressurized compartments. To prevent the resulting buckling strength concerns from becoming a detrimental factor in choosing the wall thickness of the inner shaft, and to meet fabrication demands, e.g., transportation portability, the diameter of the inner shaft 405 is minimized, and an inner ring girder 410 may be utilized locally as a weight management strategy. The ring girders 410 are attached directly to the inner shaft wall along a cross section on the inside of the inner shaft, and their vertical position can be adjusted depending on where the support is needed to withstand external pressure from ballast or punching loads from the truss members. The diameters of the inner shafts in the stabilizing columns that are not under the wind turbine tower will typically be smaller than the wind turbine tower bearing inner shaft (e.g., in the range of 3 to 6 meters for most turbines).

The inner shaft may also contain vertical access shafts to allow personnel to move efficiently up and down within the stabilizing columns for inspections or repairs of equipment.

The column outer shell 415 is sized primarily to provide sufficient buoyancy and adequate motion behavior to the floating platform. The column outer shell is a structure with straight vertical walls from the keel end 465 to the top of the columns. In some embodiments, the outer shell may be hollowed and welded to the through truss members to provide integrity of the full column buoyancy. In other embodiments, the shape of the outer shell may be constructed to provide the truss members with direct connection to the inner shaft. The outer shell 415 may be shaped as a cylindrical shell around the inner shaft 405. In some embodiments, the inner shaft may extend above and/or below the outer shell 415. In another embodiment, the outer shell 415 can have an overall cylindrical shape with pie-shaped piece(s) cut out from the surfaces of the outer shell so that the diagonal tubular members 420 and/or the horizontal main tubular members 425 may enter, such that the outer shell 415 does not come in contact with or obstruct the passage of the diagonal tubular members 420 and/or the horizontal main tubular members 425.

For most multi-megawatt offshore wind turbines, the stabilizing column diameter needs to be larger than about 4 meters, and may reach up to about 15 meters. Loads on the outer shell of the stabilizing columns are dominated by local pressures from hydrostatics and from hydrodynamic wave loads, and by wave and current loads on the stabilizing columns. Global loads transferred from the diagonal tubular members 420 and/or the horizontal main tubular members 425, which may pass through the outer shell 415, affect the outer shell only locally and are addressed with local reinforcement of the plate. In an embodiment, the outer shell 415 is therefore designed to withstand buckling of shells or plates on the outer shell. The design may include ring-stiffened cylindrical shells or flats 430a and 430b, as shown in FIG. 4b. Ring stiffened cylindrical shells, with ring girders 435, are preferred over orthogonally stiffened cylindrical shells for their cost effectiveness.

In an embodiment, the stabilizing columns are engineered for bearing relatively small vertical loads, since vertical (i.e., axial) stresses due to topside weight and turbine loads are mostly carried by the inner shaft of the corresponding stabilizing column rather than by the outer shell and vertical stiffeners (e.g., bulkheads). The vertical load is applied to the bottom or keel end of the stabilizing column, which is directly connected to both the inner shaft and the outer shell, and thus the vertical load gets split between the two structural members. Thus, the outer shell carries some of the buoyancy vertical loads applied at the keel end of the column, but these also transfer partially into the inner shaft. Consequently, the vertical load on the outer shell can be minimized.

In an embodiment, the stabilizing columns may also be compartmentalized using flats 430a and 430b and bulkheads 440 to create a void compartment 455 within the stabilizing column that can be pressurized. These flats 430a and 430b and bulkheads 440 with horizontal stiffeners 445 provide compartmental functionality and survivability of the floating wind turbine platform in case one compartment becomes flooded. Moreover, they can also be used to minimize the global loads carried by the outer shell and to transfer these loads back into the inner shaft. For example, bulkheads 440 may be loaded with shear force as a result of waves and currents.

In an embodiment, the outer shell 415 of the columns can act as a pressure vessel. Its scantling (wall thickness and stiffening) can be minimized by minimizing the effect of local pressure on the plate used to form the outer shell. This reduction in localized pressure can be achieved by balancing the external pressure from hydrostatic water level and ocean waves by providing an internal static pressure. For a cylindrical outer shell 415 made of steel for instance, the best configuration is obtained when the internal pressure always exceeds external pressure: external pressure results in buckling under compressive hoop stress while internal pressure generates tensile stress in the shell. Allowable stresses are higher under tensile than compressive stress in steel, due to higher instability in buckling.

One of the advantages of using a steel cylinder for the outer shell is that the annular permanent ballast compartments 450 may be pressurized inside. The internal static pressure may be created by a liquid or a gaseous ballast in the annular permanent ballast compartments 450 between the inner shaft and the outer shell. In the case of liquid ballast, the height of ballast determines how much pressure can be subtracted from outside pressure. For instance, if a compartment is located 10 meter below the mean waterline, and pressure from extreme waves is expected to reach an additional 10 meter head, a 20 meter high column of water (or 0.2 MPa or 2 bars) should be provided inside the compartment to compensate for the external pressure. This is achieved by filling the compartment entirely with water up to the vents, which are located at the top end of the columns and above the reach of green water, thereby preventing accidental flooding.

In an embodiment, the vents may include air intake and outlet valves on a ballast compartment. The air intake and outlet valve may be sealed during normal operation. The air intake and outlet valve may further ensure that atmospheric pressure is maintained at the top of the ballast water at the time of filling by letting air out during filling of the ballast compartment, and conversely, letting air in when the ballast compartment is drained. In this case, if the column extends to 11 meters above the mean waterline, the vent will be located at about 11.75 meters above the mean waterline, providing a column of water of more than 20 meters for pressurization of the ballast compartment, which is sufficient to cancel the external pressure. Columns typically stand about 10 meters above the mean waterline, so that extreme waves don't damage equipment on the top of column and so that water does not ingress through the vents.

In some embodiments, the internal static pressure between the inner shaft and the outer shell in the stabilizing column may be obtained by using a uniformly pressurized gas. In such cases, the ballast compartment is pressurized through the intake and outlet valve at the top of the ballast compartment at installation, and thus, a vent with the intake and outlet valve may not be necessary. The pressure may be monitored through a pressure sensor. Since the variation of pressure inside the ballast compartment does not follow the same trend as the hydrostatic pressure outside the ballast compartment (linearly proportional to water depth), but is instead uniform, the pressure inside the ballast compartment may be set to an optimized value for all levels of the ballast compartment. Unlike the case of liquid ballast, it could also be set to slightly larger pressures than the height of the column (e.g., several bars higher), if necessary.

In some embodiments, the pressure in an active ballast compartment 460 may be dynamically controlled via vents to atmosphere. These atmospheric vents may contain structures that allow air to be exhausted of to be inbound to the active ballast system. However, the vents must be shielded so as to preclude the undesirable intake of sea water during routine ocean operation. In an embodiment, an intake and outlet valve can be used to either raise or lower the pressure in a compartment accordingly. For example, a pressure monitoring system may monitor the active ballast compartment 460 using pressure sensors. In the event of a loss of pressure, an alarm may be set off, and the pressure may be adjusted automatically or via a user input. The adjustments may also account for evaporation if liquid ballast extends into the vents to the top of column. The internal pressure may be maintained to be approximately equal to the pressure from a column of water extending between a given compartment and the top of the vent. For typical column heights varying between 20 and 40 meters, internal pressures will be up to 4 bars.

Figure 5A:
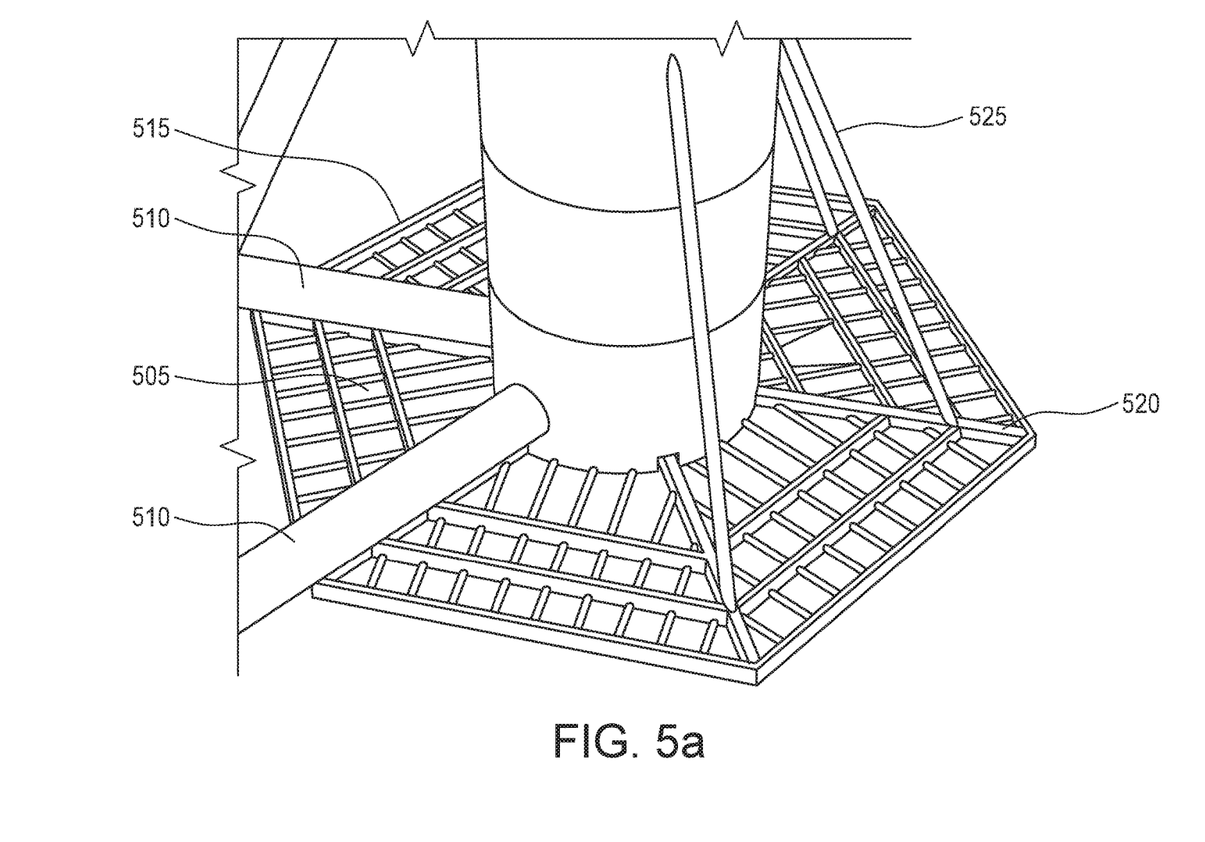
FIGS. 5a and 5b provide detailed illustrations of water entrapment plates and corresponding components.

FIG. 5a an illustration of the details of WEPs 220a, 220b and 220c. WEPs 220a, 220b and 220c are flat stiffened plates 505, which are directly connected to the keel end of the stabilizing columns. The WEPs are cantilevered outwardly from the bottom flat keel 465 of the column and use existing structural components for support. For instance, the WEP may be connected to a pair of lower horizontal main tubular members 510 where their spans intersect at the stabilizing column. The WEPs may also connect back into the keel 465 of the column. The WEPs are supported by circumferential girders 515 and radial girders 520. The radial girders 520 transfer the bending loads due to hydrodynamic loading back into the column. The flats are stiffened so that radial girders 520 are met with a matching flat girder, which in turn transfers the load back into the inner shaft. For additional stiffness, knee braces 525 may be used. The knee braces 525 are tubular members that may be small in diameter (e.g., than 1.5 meter) and may carry vertical hydrodynamic loads from the WEP primarily as axial loads, and transfer these loads back into the column outer shell. The column outer shell is locally reinforced to bear the loads. These connections between the WEP and the columns are the object of fatigue analysis as well as strength analysis.

Figure 5B:
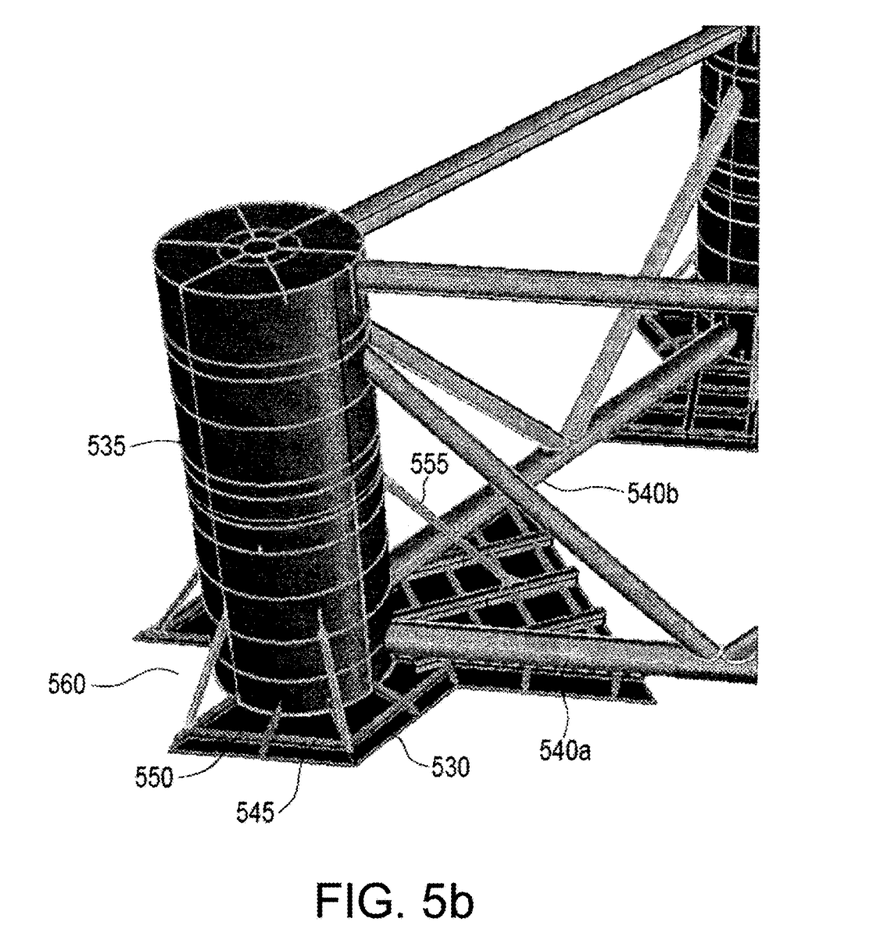

FIG. 5b provides another embodiment of WEPs 220a, 220b and 220c. In this embodiment, the flat stiffened plate 530 extends radially from at least a portion of the circumference of the stabilizing column keel end. The flat stiffened plate 530 also extends radially in the direction of the two lower horizontal main tubular members 510 connected to the stabilizing column 535. Similar to the WEP shown in FIG. 5a, the WEP in FIG. 5b is cantilevered outwardly from the keel end 465 of the column 535 and may use the two lower horizontal main tubular members 540a and 540b for support. The WEP in this embodiment is supported by circumferential girders 545 and radial girders 550. The radial girders 550 transfer the bending loads back into the column 535. The tubular member knee braces 555 may carry vertical hydrodynamic loads from the WEP, and transfer these loads back into the column 535. As shown in FIG. 5b, the portion of the WEP that extends radially in the direction of the two lower horizontal main tubular members 540a and 540b produce a triangular shaped WEP extension from the WEP portion that extends radially from at least a portion of the column 535.

Furthermore, in some embodiments, the WEP portion that extends radially from the column 535 does not extend from the entire circumference of the column 535. For example, there may be one or more gap areas 560 where the stiffened plate is not present (also shown in FIG. 4b next to the keel 465). The combined structure of the WEP (i.e., flat stiffened plate extending radially from the stabilizing column keel end and extending radially in the direction of the two lower horizontal main tubular members connected to the stabilizing column) thus is in the shape of a keyhole with a gap at the top, as shown in FIG. 4b and FIG. 5b. The shape and size of the WEP may be further modified to accommodate a variety of design constraints and expected environmental conditions when the platform structure is deployed at sea.

Figure 6:
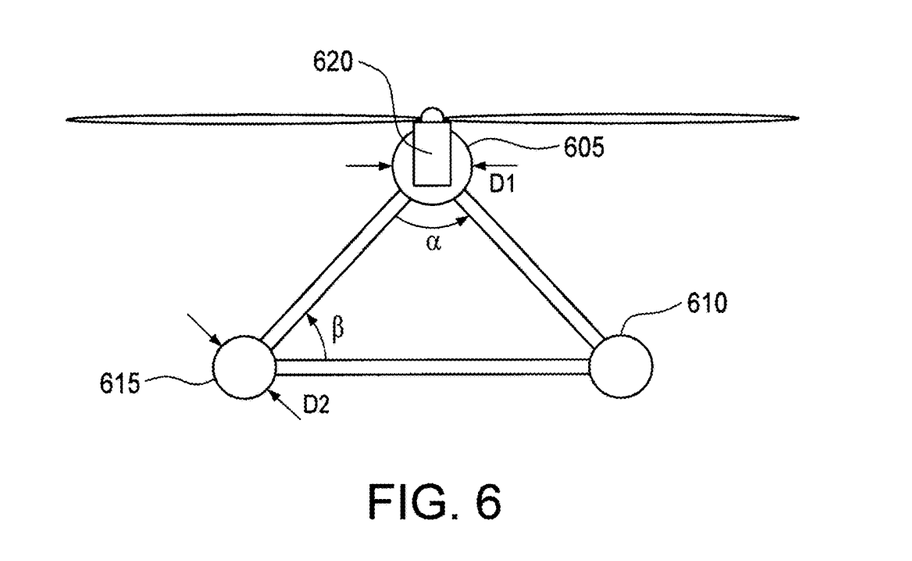
FIG. 6 provides an illustration of a top view of stabilizing column and truss structure geometry of a floating wind turbine platform.

The platform layout including the diameter of columns and their location can be adjusted depending on project specifics to result in an optimal structural configuration. FIG. 6 provides a detailed illustration of column and truss member dimensions. The diameter D1 of column 605, the column carrying the wind turbine generator tower 620, may be larger than the diameter D2 of column 610 and column 615. Furthermore, the distance between the center of column 610 to the center of column 615 may be smaller or larger than the distance between the center of column 605 to the center of column 610 or column 615. In this structural configuration, the angle between the axes connecting column 605 to column 610, and column 605 to column 615 can vary between 45 and 60, or 60 and 90 degrees. The height of the three columns above water (freeboard) and below water (draught) is adjusted depending on the metocean environment, fabrication and installation constraints, and on the turbine performance.

The description of the floating wind turbine platform above is not representative of an exhaustive list of characteristics as other structure may be incorporated. Additionally, the structures may be used individually or in combination with one another. Thus, the example illustrating the use of technology disclosed herein should not be taken as limiting or preferred. The examples provided above are merely used to illustrate the technology disclosed without being overly complicated. It is not intended to illustrate all of the technologies disclosed.

The subject technology is illustrated according to various aspects described below. A floating, semi-submersible wind turbine platform including three elongate stabilizing columns is provided. Each of the three stabilizing columns has a top end, a keel end, and an outer shell containing an inner shaft. Each of the three stabilizing columns also has a water entrapment plate at its keel end. Furthermore, each water entrapment plate is cantilevered in a plane perpendicular to a longitudinal axis of the stabilizing column.

Additionally, the floating, semi-submersible wind turbine platform includes three truss members, where each truss member includes two horizontal main tubular members and two diagonal tubular members. Each of the horizontal main tubular members has a first end for connecting to the inner shaft of one of the three stabilizing columns, and a second end for connecting to the inner shaft of a different one of the three stabilizing columns. The interconnected three stabilizing columns and three truss members form a triangular cross-section in a plane perpendicular to the longitudinal axes of the three stabilizing columns, where the three sides of the triangular cross-section are the three truss members and the three vertices of the triangular cross-section are the three stabilizing columns. For each truss member, each of the two diagonal tubular members also have a first end and a second end where the first end of each diagonal tubular member is connected to the inner shaft of one stabilizing column, and the second end of each diagonal tubular member is connected to one of the horizontal tubular members in the same truss member. The floating, semi-submersible wind turbine platform further includes an elongate wind turbine tower disposed over the top end of one of the three stabilizing columns such that the longitudinal axis of the tower is substantially parallel to the longitudinal axis of the stabilizing column.

In an embodiment, pie-shaped cutouts are disposed on a side of each of the column outer shells to provide a gap for two corresponding truss members of the three truss members to connect to the inner shaft. In some embodiments, the three truss members are also connected to the column outer shells of the three stabilizing columns. The three truss members pass through and are connected to the column outer shells as well as connected to the inner shafts.

In some embodiments, one of the three truss members is of a different length from the other two truss members, thus forming a triangular cross-section that is an isosceles triangle. The wind turbine tower, in this embodiment, is disposed over the top end of the stabilizing column connected to the other two truss members of the same length.

In an embodiment, the three truss members are of equal length, where the triangular cross-section formed is an equilateral triangle.

In some embodiments, an annular compartment is formed between each of column outer shells and corresponding inner shafts. The annular compartments provide a volume that is pressurizable with at least one of a liquid and a gas.

In an embodiment, one of the three stabilizing columns is of a larger diameter than the other two stabilizing columns, and the wind turbine tower is disposed over the top end of the one stabilizing column having the larger diameter.

In an embodiment, a ballast tank is disposed within each of the three stabilizing columns. The ballast tanks are used to contain ballast that is transferable between the three stabilizing columns by a ballast control system.

In some embodiments, the column outer shell of each of the three stabilizing columns is structurally supported by at least one of bulkheads, ring girders and ring-stiffened cylindrical flats. In some embodiments, the inner shaft of each of the three stabilizing columns is structurally supported by ring girders. And in some embodiments, the column outer shell of each of the three stabilizing columns is structurally supported by at least one of bulkheads, ring girders and ring-stiffened cylindrical flats, and the inner shaft of each of the three stabilizing columns is structurally supported by ring girders.

In an embodiment, each water entrapment plate extends i) radially from at least a portion of the circumference of the stabilizing column keel end, and ii) radially in the direction of two of the truss members connected to the stabilizing column. In an embodiment, as a result of the radially extensions, each water entrapment plate forms roughly a keyhole shape in the plane of the plate.

A floating, semi-submersible wind turbine platform including three elongate stabilizing columns, where each of the three stabilizing columns has a top end, a keel end, and annular compartments between an outer shell and an inner shaft contained by the column outer shell, is also provided. Each of the three stabilizing columns has a water entrapment plate at its keel end. The water entrapment plate is cantilevered in a plane perpendicular to a longitudinal axis of the stabilizing column.

The floating, semi-submersible wind turbine platform includes three truss members, where each truss member includes two horizontal main tubular members and two diagonal tubular members. Each of the horizontal main tubular members has a first end for connecting to the inner shaft of one of the three stabilizing columns, and a second end for connecting to the inner shaft of a different one of the three stabilizing columns. The interconnected three stabilizing columns and three truss members form a triangular cross-section in a plane perpendicular to the longitudinal axes of the three stabilizing columns, where the three sides of the triangular cross-section are the three truss members, and the three vertices of the triangular cross-section are the three stabilizing columns. For each truss member, each of the two diagonal tubular members also have a first end and a second end where the first end of each diagonal tubular member is connected to the inner shaft of one stabilizing column, and the second end of each diagonal tubular member is connected to one of the horizontal tubular members in the same truss member. The floating, semi-submersible wind turbine platform further includes an elongate wind turbine tower disposed over the top end of one of the three stabilizing columns such that the longitudinal axis of the tower is substantially parallel to the longitudinal axis of the stabilizing column.

In some embodiments, the annular compartments are separated by at least one of bulkheads and ring-stiffened cylindrical flats. In an embodiment, the column outer shell of each of the three stabilizing columns is structurally supported by at least one of the bulkheads, the ring-stiffened cylindrical flats and ring girders.

In some embodiments, one of the three truss members is of a different length from the other two truss members, thus forming a triangular cross-section that is an isosceles triangle. The wind turbine tower is disposed over the top end of the stabilizing column connected to the other two truss members of the same length.

In an embodiment, the three truss members are of equal length, where the triangular cross-section formed is an equilateral triangle.

In some embodiments, the annular compartments provide a volume that may be pressurized with at least one of a liquid and a gas.

In an embodiment, one of the three stabilizing columns is of a larger diameter than the other two stabilizing columns, and the wind turbine tower is disposed over the top end of the one stabilizing column having the larger diameter.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. All structural and functional equivalents to the elements of the various aspects described throughout this disclosure that are known or later come to be known to those of ordinary skill in the art are expressly incorporated herein by reference and are intended to be encompassed by the claims.

The invention claimed is:

1. A floating, semi-submersible wind turbine platform comprising:
three elongate stabilizing columns, each of the three stabilizing columns having a top end, a keel end, and an outer shell containing an inner shaft, each of the three stabilizing columns having a water entrapment plate at its keel end, each water entrapment plate being cantilevered in a plane perpendicular to a longitudinal axis of the stabilizing column;
three truss members, each truss member including two horizontal main tubular members and two diagonal tubular members, each of the horizontal main tubular members having a first end for connecting to the inner shaft of one of the three stabilizing columns and a second end for connecting to the inner shaft of a different one of the three stabilizing columns such that the interconnected three stabilizing columns and three truss members form a triangular cross-section in a plane perpendicular to the longitudinal axes of the three stabilizing columns, where the three sides of the triangular cross-section are the three truss members and the three vertices of the triangular cross-section are the three stabilizing columns, and for each truss member, the two diagonal tubular members each having a first end and a second end where the first end of each diagonal tubular member is connected to the inner shaft of one stabilizing column and the second end of each diagonal tubular member is connected to one of the horizontal tubular members in the same truss member; and
an elongate wind turbine tower disposed over the top end of one of the three stabilizing columns such that the longitudinal axis of the tower is substantially parallel to the longitudinal axis of the stabilizing column.

2. The floating wind turbine platform of claim 1, wherein pie-shaped cutouts are disposed on a side of each of the column outer shells to provide a gap for two corresponding truss members of the three truss members to connect to the inner shaft.

3. The floating wind turbine platform of claim 1, wherein the three truss members are also connected to the column outer shells of the three stabilizing columns, the three truss members passing through and being connected to the column outer shells as well as connected to the inner shafts.

4. The floating wind turbine platform of claim 1, wherein one of the three truss members is of a different length from the other two truss members, and wherein the triangular cross-section is an isosceles triangle.

5. The floating wind turbine platform of claim 4, wherein the wind turbine tower is disposed over the top end of the stabilizing column connected to the other two truss members of the same length.

6. The floating wind turbine platform of claim 1, wherein the three truss members are of equal length, and wherein the triangular cross-section is an equilateral triangle.

7. The floating wind turbine platform of claim 1, wherein an annular compartment is formed between each of column outer shells and corresponding inner shafts, the annular compartments providing a volume that is pressurizable with at least one of a liquid and a gas.

8. The floating wind turbine platform of claim 1, wherein one of the three stabilizing columns is of a larger diameter than the other two stabilizing columns, the wind turbine tower being disposed over the top end of the one stabilizing column having the larger diameter.

9. The floating wind turbine platform of claim 1, wherein a ballast tank is disposed within each of the three stabilizing columns, the ballast tanks being used to contain ballast that is transferable between the three stabilizing columns by a ballast control system.

10. The floating wind turbine platform of claim 1, wherein the column outer shell of each of the three stabilizing columns is structurally supported by at least one of bulkheads, ring girders and ring-stiffened cylindrical flats.

11. The floating wind turbine platform of claim 1, wherein the inner shaft of each of the three stabilizing columns is structurally supported by ring girders.

12. The floating wind turbine platform of claim 1, wherein the column outer shell of each of the three stabilizing columns is structurally supported by at least one of bulkheads, ring girders and ring-stiffened cylindrical flats, and wherein the inner shaft of each of the three stabilizing columns is structurally supported by ring girders.

13. The floating wind turbine platform of claim 1, wherein each water entrapment plate extends i) radially from at least a portion of the circumference of the stabilizing column keel end, and ii) radially in the direction of two of the truss members connected to the stabilizing column, each water entrapment plate forming a keyhole shape.

14. A floating, semi-submersible wind turbine platform comprising:
three elongate stabilizing columns, each of the three stabilizing columns having a top end, a keel end, and annular compartments between an outer shell and an inner shaft contained by the column outer shell, each of the three stabilizing columns having a water entrapment plate at its keel end, each water entrapment plate being cantilevered in a plane perpendicular to a longitudinal axis of the stabilizing column;
three truss members, each truss member including two horizontal main tubular members and two diagonal tubular members, each of the horizontal main tubular members having a first end for connecting to the inner shaft of one of the three stabilizing columns and a second end for connecting to the inner shaft of a different one of the three stabilizing columns such that the interconnected three stabilizing columns and three truss members form a triangular cross-section in a plane perpendicular to the longitudinal axes of the three stabilizing columns, where the three sides of the triangular cross-section are the three truss members and the three vertices of the triangular cross-section are the three stabilizing columns, and for each truss member, the two diagonal tubular members each having a first end and a second end where the first end of each diagonal tubular member is connected to the inner shaft of one stabilizing column and the second end of each diagonal tubular member is connected to one of the horizontal tubular members in the same truss member; and an elongate wind turbine tower disposed over the top end of one of the three stabilizing columns such that the longitudinal axis of the tower is substantially parallel to the longitudinal axis of the stabilizing column.

15. The floating, semi-submersible wind turbine platform of claim 14, wherein the annular compartments are separated by at least one of bulkheads and ring-stiffened cylindrical flats.

16. The floating, semi-submersible wind turbine platform of claim 15, wherein the column outer shell of each of the three stabilizing columns is structurally supported by at least one of the bulkheads, the ring-stiffened cylindrical flats and ring girders.

17. The floating, semi-submersible wind turbine platform of claim 14, wherein one of the three truss members is of a different length from the other two truss members, the triangular cross-section being an isosceles triangle, and wherein the wind turbine tower is disposed over the top end of the stabilizing column connected to the other two truss members of the same length.

18. The floating, semi-submersible wind turbine platform of claim 14, wherein the three truss members are of equal length, and wherein the triangular cross-section is an equilateral triangle.

19. The floating, semi-submersible wind turbine platform of claim 14, wherein the annular compartments provide a volume that may be pressurized with at least one of a liquid and a gas.

20. The floating, semi-submersible wind turbine platform of claim 14, wherein one of the three stabilizing columns is of a larger diameter than the other two stabilizing columns, the wind turbine tower being disposed over the top end of the one stabilizing column having the larger diameter.

* * * * *